United States Patent Office 3,848,012
Patented Nov. 12, 1974

3,848,012
ALKYLATION PROCESS
Fred Applegath, Texas City, Louis E. Du Pree, Jr., Hitchcock, Alistair C. MacFarlane, Texas City, and Jacques D. Robinson, Alvin, Tex., assignors to Monsanto Company, St. Louis, Mo.
No Drawing. Filed Sept. 26, 1973, Ser. No. 400,999
Int. Cl. C07c 3/56, 3/62
U.S. Cl. 260—671 R
8 Claims

ABSTRACT OF THE DISCLOSURE

An improved process is provided for continuously producing ethylbenzene by reaction of benzene and ethylene using very small amounts of aluminum chloride as catalyst in a liquid homogeneous alkylation-transalkylation system at relatively long reaction times and high temperatures with the rate of ethylene addition controlled so that no excess ethylene is ever present in the alkylator while the reactants and catalyst are mixed at reaction temperature. The conditions specified preclude the presence of a separate catalyst complex phase thus obviating the step of removal and recycle of such material, and result in a purer ethylbenzene product, lower tar make and certain ecological advantage.

BACKGROUND OF THE INVENTION

The present invention relates to an improved process for the catalytic alkylation of aromatic hydrocarbons with olefins employing a Friedel-Crafts type catalyst. More particularly, it relates to an improved process for the alkylation of benzene with ethylene in the presence of an aluminum chloride ($AlCl_3$) catalyst in which the amounts of the catalyst and benzene used per pound of ethylbenzene produced are significantly below the amounts used in the prior art processes.

Ethylbenzene is used in large quantities for the manufacture of styrene monomer which is the raw material for polystyrene, a plastic product in great demand, as well as for many copolymers with varied and extensive uses. It is well known in the art to produce ethylbenzene by alkylating benzene with ethylene in the presence of an $AlCl_3$ catalyst. The alkylation reaction is commonly carried out in a heterogeneous liquid medium, the catalyst ordinarily being employed as a liquid complex of $AlCl_3$ and a mixture of ethylated benzenes. Thus, the liquid product of the reaction consists of two phases: one, the $AlCl_3$ catalyst complex, which is generally separated and recycled to the alkylator, and the other a mixture of the unreacted benzene and the products of the reaction, ethylbenzene, diethylbenzene and higher polyethylbenzenes. The presence of a separate catalyst complex phase severely limits the temperature of the process to less than 130° C. At temperatures of 130° C. and above, a rapid degradation of the activity of the $AlCl_3$ catalyst complex takes place. At the higher temperatures there is also a major increase in the production of non-aromatic hydrocarbons and polyaromatic compounds which are basic in nature and preferentially dissolve in the highly acidic complex. With continued recirculation of catalyst complex, the heavy aromatics tend to degrade and polymerize to sludge-like, non-useful by-products collectively referred to as flux oil or tars. Also, in some methods during the formation of $AlCl_3$ catalyst complexes, certain non-aromatic hydrocarbon impurities are formed which are extremely difficult if not impossible to separate by distillation from the alkylate and consequently are carried over as impurities into the product ethylbenzene as well as into the desired final styrene product. All these effects contribute to rapid loss of catalyst activity and poor catalyst life.

The alkylation reaction is very fast and as it is ordinarily conducted, the alkylation product contains a considerable amount of polyethylbenzene because as soon as some monoethylbenzene is formed, the ethylene tends to add onto the monoethylbenzene to give diethylbenzene. The more ethyl groups on the benzene ring, the more reactive the molecule becomes so that unless steps are taken to prevent it, the alkylate ultimately would consist predominantly of a mixture of unreacted benzene and polyethylbenzenes. In view of the relative basicities of benzene and the higher polyethylbenzenes, as the reaction proceeds, alkylation declines and ultimately ceases because the polyalkylated compounds react with the acid $AlCl_3$ making it unavailable for catalysis. In the prior art, attempts have been made to capitalize on the speed of the alkylation reaction by employing smaller reactors wherein the reaction time provided is not greater than two minutes (See U.S. 3,448,161) and in which a very active catalyst complex is employed. This process, however, still involves a heterogeneous system wherein the $AlCl_3$ catalyst complex is a separate phase and is recycled to the alkylation reaction with all the attendant disadvantages already discussed above.

SUMMARY OF THE INVENTION

It has now been determined that an essentially improved overall process which overcomes many of the aforesaid disadvantages of the processes of the prior art results when the alkylation process is conducted under a specialized set of reaction conditions. In the process of the invention, relatively long reaction times at higher temperatures are employed with such small amounts of $AlCl_3$ that the liquid reaction system is a homogeneous one, that is, a system wherein the catalyst is present in solution and no catalyst complex phase exists as such in the alkylator and/or transalkylator, nor are any suspended or dispersed catalyst solids present in either. This is accomplished by controlling the rate of ethylene addition carefully, i.e., adding the ethylene at a rate which insures that no excess ethylene is ever present in the alkylator while the reactants and catalyst are mixed at reaction temperature. In accord with the process of the invention, ethylbenzene is produced by a process which comprises simultaneously and continuously introducing ethylene, benzene and $AlCl_3$ catalyst into a first reaction zone or alkylator maintained at a temperature from 140° to 200° C. and a pressure sufficient to maintain the reactants substantially in the liquid phase wherein the reaction or residence time is at least 15 minutes, the amount of $AlCl_3$ being in the range from about 0.0010 to about 0.0025 mole per mole of ethylene, the ethylene being added at a rate from about 300 to 1500 moles per hour per mole of accumulated $AlCl_3$, and the ratio of ethyl groups to benzene rings in the alkylate ($E/B$ ratio) being in the range from about 0.3 to 0.9, continuously conveying the reaction product from said first reaction zone to a second reaction zone or transalkylator, maintaining it therein for a period of at least 15 minutes at a temperature from 140° to 200° C., and continuously withdrawing the resulting reaction product from said second reaction zone. The term "accumulated $AlCl_3$" as used above and elsewhere in this specification and claims is defined as the amount of $AlCl_3$ present in the reactor at any given time and not necessarily the concentration.

The reaction product or alkylate withdrawn is cooled, washed with water and with caustic to remove the catalyst present and subjected to distillation in the usual manner to separate the monoethylbenzene from the other higher ethylated or polyethylbenzenes and unreacted benzene. The polyethylbenzenes may then be recycled to the second reaction zone or transalkylator while the unreacted benzene is recycled to the first reaction zone or alkylator. By conducting the alkylation process in the manner described, as many as 400 and more molecular equivalents of ethylene may be reacted per mole of the $AlCl_3$ catalyst. This is a distinct advance over the prior art $AlCl_3$ usage and is an important feature from an ecological point of view as well since waste disposal problems are significantly reduced. The entire reaction system including both alkylation and transalkylation stages is a homogeneous one obviating the need for removal and recycle of a separate catalyst complex phase with all its attendant disadvantages. Since the catalyst is maintained in solution in the reaction mixture or alkylated product, there is no requirement for a separation stage prior to washing and recovery of the alkylation products in the usual manner by distillation. The ethylbenzene product recovered is a purer one and is produced in better yields as compared to previous methods of alkylation while the flux oil or tar make is significantly reduced.

DESCRIPTION OF THE PREFERRED EMBODIMENTS

The improved process of the present invention employing a homogeneous reaction medium in both reactors or reaction stages, i.e., alkylation and transalkylation, can be carried out in generally the same equipment as previous processes. The alkylation reactor can be a vertical, flooded, co-current, bubble-type reactor or tower fabricated of brick-lined steel with a suitable membrane into which ethylene, benzene and $AlCl_3$ catalyst are fed at the bottom. The alkylate overflows into the transalkylator which preferably is a horizontal brick-lined vessel similar in design to the alkylator but equipped with suitable brick baffles. However, a vertical, tower-type transalkylator preferably constructed of or lined with a substance resistant to corrosion by acids can also be employed. The contents of the alkylator are naturally agitated by the gas-lift effect of the incoming ethylene but further agitation can be provided if desired by circulating pumps, by impellers or by any of the conventional expedients commonly employed for such purposes. The contents of the transalkylator are not agitated, plug flow being the highly desirable method for use therein.

The alkylate washing operations and subsequent distillation for recovery of the separate alkylated products are performed in a conventional manner using apparatus of the known type generally employed. In the present process, washing of the alkylated product with water followed by an aqueous caustic solution has been found to effectively reduce any $AlCl_3$ catalyst present in the alklate and prepare the reaction product for separation, recovery and recycle of its components. The resulting aqueous $AlCl_3$ and caustic solutions can be disposed of by known techniques.

The temperatures employed are high in contrast to those commonly used in the prior art processes being limited only by those temperatures at which the reaction mixture cannot be maintained in the liquid phase. In view of the homogeneous reaction system, temperatures from 140° to 200° C. and above can be employed without the degradation of catalyst which occurs when a separate catalyst complex phase is present at such temperatures. Preferably, the temperature is maintained in the range of 160° to 180° C. and even more preferably is maintained at about 160° C.

Pressure is not a critical variable. The process may be operated at any pressure sufficient to maintain the reactants substantially in the liquid phase. Generally, pressures from atmospheric to 300 p.s.ig. above atmospheric are suitable and preferably, the pressure is maintained between about 70 and 150 p.s.i.g.

The manner in which the reactants and catalyst are fed to the alkylator is critical in that the process must be a truly continuous one. The reactants must be fed simultaneously in the correct proportions while the alkylator is maintained at reaction temperature. Feeding of the reactants into a zone where they are mixed and then heated together to bring them up to reaction temperature as is described, for example, in U.S. Pat. 2,403,785, will not provide the advantages obtained by the instant process. The rate of addition of the olefin must be controlled to eliminate the presence in the alkylator of any free olefin, "free olefin" being defined to mean olefin unassociated with the catalyst. To accomplish this, the olefin must be fed at a rate of about 300 to 1500 moles/hour/mole of accumulated $AlCl_3$ and an $E/B$ ratio between 0.3 to 0.9 must be employed. For the most efficient production of monoethylbenzene, the ethylene addition rate is maintained at a rate of from about 600 to about 1000 moles/hour/mole of accumulated $AlCl_3$ while the $E/B$ ratio is maintained between 0.35 and 0.50.

Although it is highly desirable, pure ethylene is not required for the process. Ethylene diluted by inert impurities in amounts up to about 20% by volume can also be employed. With dilute ethylene as feed, conventional vent facilities for inert gases may be provided in the system at appropriate points. Any conventional means of introducing and distributing the ethylene in the alkylator to obtain good circulation and mixing in this reaction zone may be employed. Preferably, a gas sparger at the bottom of the reactor is used.

The liquid residence time in the alkylator must be at least 15 minutes but may be longer than this, say up to two hours or more. Preferably, the residence time provided in the alkylator is from about 30 minutes to about 60 minutes. The residence time in the transalkylator depends upon the reaction conditions employed in the alkylator since these determine the amount of polyethylbenzenes to be recycled. Generally, it must be at least 15 minutes. Preferably, it is from about 15 to about 60 minutes or substantially the same as that in the alkylator but could be different within the same general range given.

One of the major features of the present process is the exceedingly small amount of $AlCl_3$ catalyst required. Amounts of $AlCl_3$ catalyst which are effective are those in the range from about 0.0010 to about 0.0025 mole/mole of ethylene and preferably from about 0.0015 to about 0.0022 mole/mole of ethylene. By employing such small quantities of catalyst, the $AlCl_3$ is used on a once-through basis and no catalyst or catalyst complex phase is present or is required to be recycled. The system is a homogeneous one throughout, both in the alkylation and in the transalkylation stages. Since the small amount of $AlCl_3$ used also permits the use of higher temperatures in the alkylation reaction as indicated above, increases in catalytic activity occur. Another significant advantage is the reduction in waste disposal problems. Since the spent catalyst stream presents a particularly difficult problem for a waste treatment facility, the substantial reductions in catalyst usage which are afforded by the process of the invention alleviate the waste disposal problem considerably. The $AlCl_3$ catalyst may be added as such in solid, powdered form or it may be added as a solution in ethylbenzene or benzene, for example, or it may be generated *in situ* by the reaction of aluminum metal and HCl with the product being dissolved as it is made in ethylbenzene or alkylated product for convenient introduction into the reaction zone.

In order to achieve the most effective operation and highest efficiency, a halide promoter is usually employed with the catalyst although the alkylation reaction proceeds without any promoter present. Halides suitable as promoters are those well known in the art such as HCl, HBr, HF, alkyl chlorides such as ethyl chloride, and the like, or any substance which produces such halides *in situ*. When a promoter is added, the amount used is generally from about 0.5 to about 10 moles per mole of $AlCl_3$. More can be employed but it serves no useful purpose. Preferably, the amount of promoter employed is from about 1 to about 5 moles per mole of $AlCl_3$.

The reactants and the catalyst are usually employed in as nearly an anhydrous condition as possible. Only minor amounts of moisture may be tolerated.

Any of the conventional chemical means known for removal of the catalyst from the alkylate such as washing with water or an aqueous alkali solution, washing with water followed by washing with caustic or by adding ammonia to form a precipitate, and the like, can be used. Any residual catalyst is preferably removed before distillation of the alkylate.

The alkylate is separated into its components to recover ethylbenzene by use of any conventional distillation system and the details of this system form no essential part of the process of the invention.

The yield may be further improved by recycling the polyethylbenzene fraction to the second reaction zone where homogeneous transalkylation occurs under the specified conditions converting a portion of the polyethylbenzenes to ethylbenzene by their reaction with benzene in the presence of $AlCl_3$. However, when employing the homogeneous alkylation system of the present invention, substantial amounts of the polyethylbenzene fraction cannot be recycled to the first alkylation zone without terminating the alkylation reaction therein. Any unreacted benzene, however, recovered from the distillation may be recycled to the first reaction zone.

The following examples illustrate the invention but are not to be construed as limiting it in any manner except insofar as it is limited in the attached claims.

EXAMPLE 1

A series of runs was conducted in which benzene was continuously alkylated with ethylene employing $AlCl_3$ as the catalyst and HCl as a promoter. The apparatus employed consisted of two reactors, an alkylator and a transalkylator, both of which were constituted of vertical piping fabricated from a corrosion resistant alloy about 1.5 in. in inside diameter and 45 in. long together with associated reactant supply and alkylate washing and separation trains. The alkylator was equipped with a sparge plate at the bottom and flow in both the alkylator and the transalkylator was upward. Benzene was dried azeotropically and pumped from the drying column to the alkylator. $AlCl_3$ was added as a solution in ethylbenzene to facilitate handling of the very small quantities used. On the way to the alkylator the benzene was mixed with the $AlCl_3$-in-ethylbenzene solution and the resulting stream was introduced into the alkylator above the sparge plate. The promoter was added as a benzene solution of ethyl chloride together with the ethylene into the alkylator through the sparge plate. The reaction pressure was maintained at the desired level by addition of inert gas ($N_2$). The alkylate overflowed from the alkylator, was mixed with recycled polyethylbenzenes, and flowed through the transalkylator and then to the wash system. The first- and third-stage washes were simply once-through, fresh-water washes. In the second-stage wash, the akylate was intimately contacted with a recirculating caustic solution.

The wet alkylate from the wash system was sent to a distillation train. Most of the benzene, water and non-aromatic impurities were removed in the first or benzene column and this benzene stream was recycled and mixed with incoming fresh benzene feed to the benzene drying system. The bottoms stream from the benzene column was fed to a second column where product ethylbenzene was removed overhead. The bottoms stream from the ethylbenzene column was fed to a vacuum polyethylbenzene column operated so as to remove essentially all the diethylbenzene and the triethylbenzene from the feed. The bottoms stream from this column was flux oil or tar which represented a yield loss and was sent to waste disposal.

The reaction conditions, amounts of the products made and yields in the various runs are set out in Table I below. In all these runs temperatures in both the alkylator and the transalkylator were the same.

EXAMPLE 2

A series of runs similar to that in Example 1 was conducted in which benzene was alkylated with ethylene us-

TABLE 1

| Run number | Temp., °C | Press. (p.s.i.g.) | E/B ratio | $AlCl_3$ mol/mol $C_2H_4$ | HCl/$AlCl_3$ | Residence time (min.) Alk. | Residence time (min.) Trans. alk. | Mole $C_2H_4$/hr/mol AccAlCl$_3$ | Recycle PEB, lb./100 lb. EB | Flux oil, lb./100 lb. EB | Yield, percent Bz | Yield, percent $C_2H_4$ | Average percent EB — EB product | Average percent EB — Alkylator product | Average percent EB — Transalkylator product | Mol. equiv. $C_2H_4$ reacted/mol $AlCl_3$ |
|---|---|---|---|---|---|---|---|---|---|---|---|---|---|---|---|---|
| 1 | 140 | 100 | 0.43 | 0.00217 | 1.0 | 35.0 | — | 788.5 | — | Unstable Conditions | | | Alkylation failed | | | |
| 2 | 140 | 100 | 0.43 | 0.00231 | 2.05 | 37.3 | — | 696.4 | — | Unstable Conditions | | | Alkylation failed | | | |
| 3 | 140 | 100 | 0.44 | 0.00239 | 3.6 | 36.7 | 32.5 | 684.0 | 29.0 | 0.98 | 91.4 | 94.6 | 99.93 | 31.0 | 42.6 | 418.4 |
| 4 | 140 | 100 | 0.43 | 0.00217 | 3.9 | 36.1 | 32.3 | 764.5 | 33.5 | 0.96 | 93.9 | 97.4 | 99.94 | 34.5 | 43.6 | 460.8 |
| 5 | 140 | 100 | 0.43 | 0.00217 | 1.0 | 35.3 | 31.2 | 781.8 | 28.6 | 0.81 | 94.6 | 96.7 | 99.93 | 33.4 | 43.1 | 460.8 |
| 6 | 160 | 100 | 0.44 | 0.00217 | 1.06 | 33.8 | 30.9 | 957.7 | 84 | 0.97 | 97.8 | 98.1 | 99.95 | 27.0 | 35.9 | 537.6 |
| 7 | 160 | 150 | 0.43 | 0.00186 | 1.4 | 33.2 | 24.3 | 955.6 | 48 | 0.86 | 94.0 | 93.3 | 99.93 | 28.1 | 39.5 | 613.5 |
| 8 | 200 | 100 | 0.44 | 0.00163 | 1.0 | 33.5 | 33.2 | 619.9 | 49.0 | 1.26 | 95.0 | 96.2 | 99.88 | 42.4 | 47.1 | 440.5 |
| 9 | 160 | 150 | 0.54 | 0.00227 | 1.0 | 42.6 | 33.4 | 870.7 | 51.0 | 0.92 | 99.6 | 96.3 | 99.90 | 38.7 | 47.7 | 478.4 |
| 10 | 160 | 100 | 0.54 | 0.00209 | 1.0 | 32.9 | 24.9 | 619.3 | 34.0 | 0.72 | 93.8 | 97.1 | 99.93 | 33.0 | 43.2 | 423.7 |
| 11 | 160 | 70 | 0.42 | 0.00236 | 1.0 | 35.3 | 30.4 | 718.7 | 32.0 | 0.77 | 95.6 | 99.6 | 99.92 | 35.0 | 43.3 | 460.8 |
| 12 | 160 | 150 | 0.44 | 0.00217 | 1.0 | 35.7 | 30.8 | 791.0 | 97 | 0.95 | 97.2 | 95.7 | 99.95 | 24.0 | 31.5 | 628.9 |
| 13 | 160 | 80 | 0.44 | 0.00159 | 0.98 | 35.7 | 24.8 | 1054.7 | 34.0 | 0.94 | 95.0 | 95.5 | 99.95 | 34.6 | 42.9 | 460.8 |
| 14 | 160 | 100 | 0.43 | 0.00217 | 1.0 | 34.3 | 29.8 | 804.6 | — | — | 97.0 | 96.3 | — | — | — | — |
| 15 | 160 | 100 | 0.41 | 0.00143 | 2.0 | 36.1 | 30.8 | 883.6 | 37 | 0.90 | 96.7 | 96.3 | 99.92 | 30.9 | 42.6 | 699.3 |

[1] Catalyst made in situ from Al metal and HCl.

ing $AlCl_3$ catalyst and HCl promoter. The equipment and procedure were the same as in Example 1 except that in these runs the alkylator and transalkylator were slightly larger vessels, both having an I.D. of 2 in. and an approximate length of 50 in. Results of these runs which are presented in Table 2 below are generally comparable with those obtained in Example 1.

It will be seen from a consideration of the results in Tables 1 and 2 that the alkylation of benzene with ethylene can be successfully accomplished in the homogeneous phase, i.e., without any catalyst complex present as a separate phase, provided a specific set of reaction conditions is employed and in particular, if the ethylene is fed at such a rate as to avoid the presence of any excess olefin in the alkylator at any time. In terms of catalyst usage, i.e., molecular equivalents of ethylene reacted per mole of $AlCl_3$, the process uses significantly less catalyst than any of the prior art processes. Also, the extremely low amounts of flux oil or tar made are indicative that this method of alkylation is highly efficient. The average amount of flux oil or tar made is approximately half of the average amount generally produced in a known commercial operation for producing ethylbenzene from benzene and ethylene using $AlCl_3$ catalyst and HCl promoter wherein a separate $AlCl_3$ complex phase exists in the alkylation and transalkylation reaction zones.

TABLE 2

| Run number | 1 | 2 | 3 | 4 |
|---|---|---|---|---|
| Temperature, °C.: | | | | |
| Alkylator | 160 | 160 | 160 | 178 |
| Transalkylator | 140 | 145 | 146.8 | 162.6 |
| Pressure, p.s.i.g | 100 | 100 | 100 | 100 |
| E/B | 0.43 | 0.53 | 0.53 | 0.51 |
| $AlCl_3$, mol/mol $C_2H_4$ | 0.00217 | 0.00143 | 0.00154 | 0.00149 |
| $HCl/AlCl_3$ | 1.1 | 1.15 | 4.9 | 1.12 |
| Residence time, min.: | | | | |
| Alkylator | 61.3 | 52.9 | 53.2 | 53.7 |
| Transalkylator | 47.7 | 40.3 | 42.2 | 41.1 |
| Moles $C_2H_4$/hr./mol $AccAlCl_3$ | 450.2 | 791.4 | 730.88 | 750.2 |
| Recycle PEB, lb./100 lb. EB | 26 | 69 | 51 | 62 |
| Flux oil, lb./100 lb. EB | 0.93 | 0.94 | 0.87 | 1.03 |
| Yield, percent: | | | | |
| Bz | 95.3 | 93.9 | 95.6 | 96.7 |
| $C_2H_4$ | 95.0 | 96.0 | 100.4 | 97.8 |
| Average percent EB in— | | | | |
| EB product | 99.93 | 99.94 | 99.93 | 99.92 |
| Alkylator | 35.0 | 33.0 | 40.6 | 34.8 |
| Transalkylator | 42.4 | 41.1 | 44.7 | 42.4 |
| Mol. equiv. $C_2H_4$ reacted per mole $AlCl_3$ | 460.8 | 699.3 | 649.3 | 671.1 |

In addition, the average purity of the recovered ethylbenzene is about 99.9% as compared to an average value of about 99.6% which characterizes the product of the known commercial operation just mentioned wherein a separate $AlCl_3$ catalyst complex phase is present.

While the invention has been described and exemplified by particular reference to the preparation of ethylbenzene, the inventive concept is equally applicable in other Friedel-Crafts alkylations involving olefins such as those, for example, in which ethylene is reacted with substituted benzenes or naphthalenes, propylene is reacted with benzene to form isopropylbenzene or cumene, butenes are reacted with benzene to form butylbenzenes and the like. Also, it is apparent that other metal halides of the class generally described as Friedel-Crafts catalysts may be substituted for the $AlCl_3$ catalyst herein.

What is claimed is:

1. A continuous process for the production of ethylbenzene which comprises simultaneously introducing benzene, ethylene and $AlCl_3$ catalyst into a first reaction zone maintained at a temperature from 140 to 200° C. and a pressure sufficient to maintain the reactants substantially in the liquid phase wherein the residence time is at least 15 minutes, the amount of $AlCl_3$ being in the range from about 0.0010 to about 0.0025 mole per mole of ethylene, the ethylene being added at a rate from about 300 to about 1500 moles per hour per mole of accumulated $AlCl_3$, and the $E/B$ ratio being in the range from 0.3 to 0.9, continuously removing the reaction product from said first reaction zone and introducing it into a second reaction zone, maintaining it therein for a period of at least 15 minutes at a temperature from about 140° to about 200° C., continuously removing the reaction product from said second reaction zone, and recovering ethylbenzene therefrom.

2. The process of Claim 1 wherein a halide promoter is introduced along with said benzene, ethylene and $AlCl_3$ catalyst.

3. The process of Claim 2 wherein the temperature in said first reaction zone is in the range from about 160 to about 180° C.

4. The process of Claim 3 wherein the $E/B$ ratio is in the range from about 0.35 to about 0.50.

5. The process of Claim 4 wherein the amount of $AlCl_3$ employed is in the range from 0.0015 to about 0.0022 mole per mole of ethylene.

6. The process of Claim 5 wherein the halide promoter is HCl in an amount from about 0.5 to about 10 moles per mole of $AlCl_3$.

7. The process of Claim 6 wherein the ethylene is added at a rate from about 600 to 1000 moles per hour per mole of accumulated $AlCl_3$.

8. The process of Claim 7 wherein any residual catalyst is removed from the alkylation product withdrawn from said second reaction zone, the catalyst-free product is subjected to distillation to recover ethylbenzene, unreacted benzene and polyethylbenzenes therefrom, said unreacted benzene is returned to said first reaction zone and said polyethylbenzenes are returned to said second reaction zone.

References Cited

UNITED STATES PATENTS

| | | | |
|---|---|---|---|
| 3,255,269 | 6/1966 | Gilman et al. | 260—671 R |
| 3,448,161 | 6/1969 | Garcia et al. | 260—671 R |
| 3,591,650 | 7/1971 | Mitsak | 260—671 R |
| 3,766,290 | 10/1973 | Carlson | 260—671 P |

CURTIS R. DAVIS, Primary Examiner

U.S. Cl. X.R.

260—672 T